April 22, 1958 P. W. CRAPUCHETTES 2,832,006

MAGNETRON TUNER

Filed May 19, 1954

INVENTOR
PAUL W. CRAPUCHETTES
BY R P Morris
ATTORNEY 2,832,006

MAGNETRON TUNER

Paul W. Crapuchettes, Palo Alto, Calif., assignor, by mesne assignments, to Litton Industries, Inc.

Application May 19, 1954, Serial No. 430,759

10 Claims. (Cl. 315—39.61)

Figures 1, 2, 3, 4:
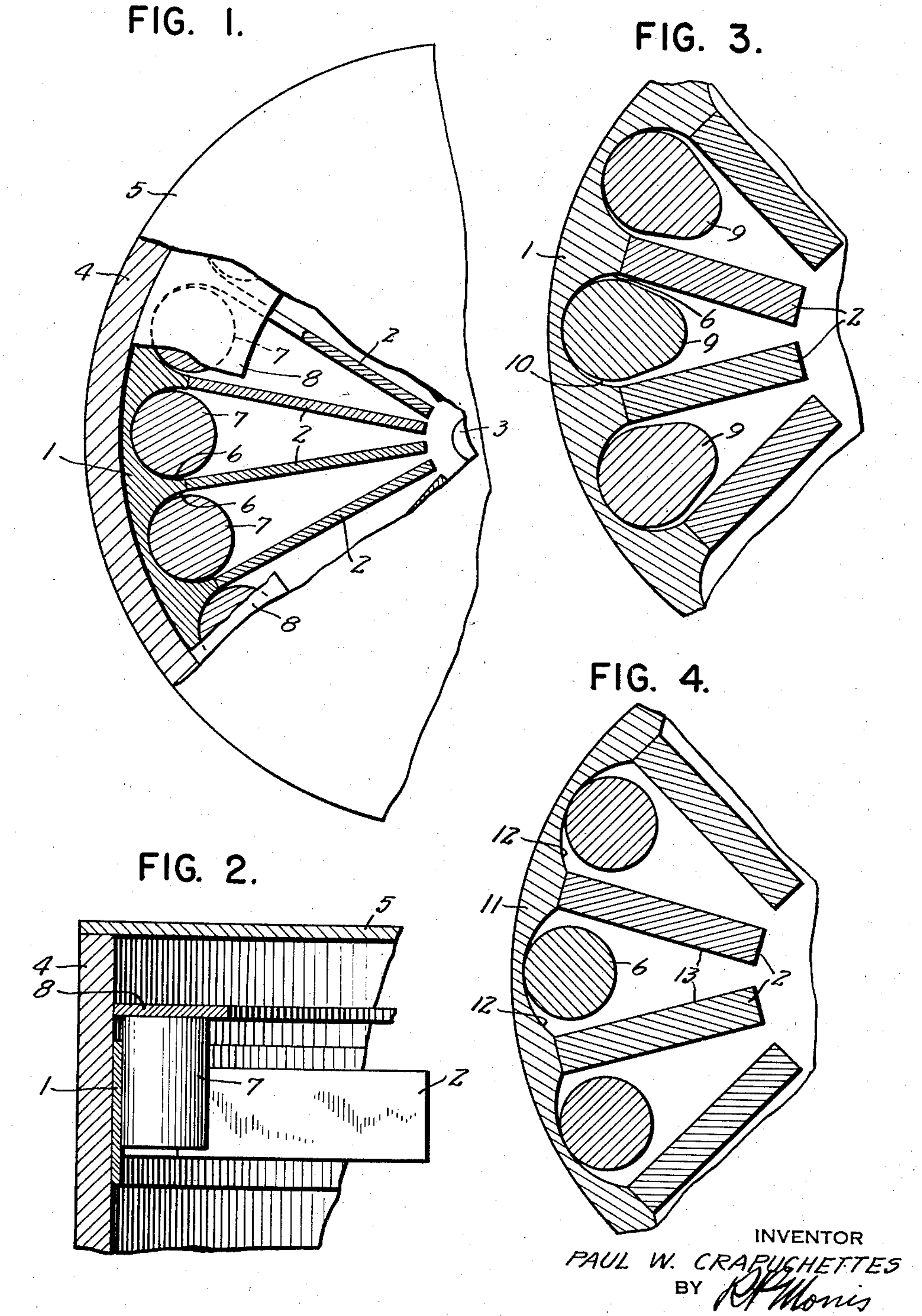

This invention relates to magnetron tuners and more particularly to tuners for multi-cavity resonator magnetrons in which plungers are inserted in resonators to effect the tuning thereof.

In tunable magnetrons, a structure has been used which comprises a plurality of contiguous resonators, formed by radial walls or vanes extending inwardly from a cylindrical outer wall. Tuning, to vary the operational characteristics upwardly to a higher frequency, is effected by plungers, preferably fastened to a common ring, positioned to be inserted to a greater or lesser degree, into said resonators adjacent the cylindrical wall. The plunger pins may be cylindrical or may be shaped to conform to the shape of the portion of the resonator in the region of insertion. With such a construction using plungers conforming to the resonator portion, tuning over the range from 9100 megacycles to 9600 megacycles has been accomplished. The tuning range may also be extended upwardly by tuning plungers adjacent the inner ends of the radial walls or vanes. However, the present invention does not concern these latter types of tuners. The tuner adjacent the outer wall effects a predominate control of the inductive reactance of the resonators while that near the inner ends of the vanes effects a predominately capacitive control.

It is an object of this invention to provide a tuner which will appreciably extend the tuning range of a magnetron in the lower end of its frequency, by increase of the inductive tuning effects.

According to a feature of this invention, each resonator of a multi-cavity resonator, formed by radial walls and an outer cylindrical wall, is modified by providing a substantially cylindrical groove in the outer wall, the surface of the wall of this groove meeting in contiguous surface relationship with the corresponding radial wall surfaces, and there is provided in each groove a plunger of slightly less diameter than that of the groove, the plungers being positioned in tangential contact with the outer wall at the center of the groove, and means for effecting control of the movement of the plungers into and out of the resonators.

It has been found that by use of this construction the tuning range of a magnetron was extended from 9100 to 9600 mc. to a range of 8800 to 9600 mc. while tuning ranges of 8000 mc. to 10,000 mc. have been achieved with other tubes.

The above-mentioned and other features and objects of this invention and the manner of attaining them will become more apparent and the invention itself will be best understood by reference to the following description of an embodiment of the invention taken in conjunction with the accompanying drawings, in which:

Fig. 1 is a plan view partly in cross section of a portion of a tunable magnetron employing a tuner according to the invention, Fig. 2 is a fragmentary elevational section of a portion of the magnetron shown in Fig. 1, and Figs. 3 and 4 illustrate in fragmentary elevational section alternative configurations of the magnetron anode and tuners.

Turning to the Figs. 1 and 2 there is shown a magnetron anode structure comprising a substantially cylindrical wall portion 1 which forms, with radial walls 2, a plurality of contiguous cavity resonators. Adjacent the inner ends of wall 2 is provided a cathode 3. An outer magnetron body portion 4 is illustrated and a cover plate 5 indicated. The cover plate 5 is shown broken away in Fig. 1 and a portion of the magnetron anode formed of walls 1 and 2 is shown in sectional view in this figure. In outer wall 1 are provided grooves 6 for each respective resonator, the wall surfaces of these grooves terminating tangentially of walls 2 of each resonator. Thus, the radius of curvature for the grooves is determined by the angular relationship of adjacent walls 2 and the over-all radius of the cylindrical wall portion 1. In each of grooves 6 is positioned a tuning plunger 7, the diameter of the tuning plungers being only slightly less than the diameter of curvature of the grooves 6. A tuning ring 8 is provided to which each of the plungers 7 is fastened so that these plungers may be simultaneously inserted and withdrawn from the resonator cavities. The plungers 7 are each so positioned as to be in tangential contact with the outer wall substantially at the center of each of the corresponding grooves.

The illustration is enlarged in the interest of clarity. In an actual magnetron structure in which there were provided tuning plungers of this type the diameter of curvature of the grooves was made substantially .055 inch and the diameter of the plunger pins was .046 inch. With this construction it was found possible to extend a tuning range of the magnetron upwardly so that a tuning range of 8800 mc. to 9600 mc. was obtained, whereas previous constructions had provided a tuning range of from 9100 mc. to 9600 mc. The extending of the tuning range by this means produced no significant variation in the operating efficiency of the magnetron throughout this tuning range.

Turning now to Fig. 3 there is shown a structure having an anode 1 formed with grooves 6 and vanes 2 similar to those of Fig. 1. However, the tuning plungers 9 are not cylindrical as in Fig. 1, but are shaped so that the radius of curvature of the part adjacent the walls of the grooves 10 corresponds substantially with the radius of pins 7 of Fig. 1. The diameter of the pins in a direction normal to the line of contact with the grooves is made greater than the diameter of part 10 so that the pins extend further into the resonator cavities. Thus a greater inductive tuning effect is achieved.

With a magnetron using plunger pins of this configuration a tuning range of 8000 mc. to 10,000 mc. has been obtained.

In the forms illustrated in Figs. 1 to 3 the grooves have been illustrated as having surfaces tangent to the adjacent radial walls. While this configuration is desirable it is not necessary to obtain some of the beneficial results of this invention. What is essential is that the groove surfaces and the vanes fit in contiguous surface relationship to one another. Such a structure is shown in Fig. 4 wherein the anode body is indicated at 11, and provided with grooves 12. The surfaces of grooves 12 are shown in contiguous surface relationship with the adjacent surfaces 13 of vanes 2. In this illustration the tuning pins 6 are shown in the same form as in Fig. 1. It will be clear, however, that pins more nearly conforming to the cavity shapes may be used, if desired, according to the showing of Fig. 3.

In all forms the pins are in tangential contact along a line with the corresponding grooves.

While I have described above the principles of this invention in connection with specific apparatus, it is to be clearly understood that this description is made only by way of example and not as a limitation to the scope of this invention as set forth in the objects thereof and in the accompanying claims.

What is claimed is:

1. A tunable magnetron provided with a sector shaped cavity resonator, formed by radial walls and an outer substantially cylindrical wall, said radial walls providing an interaction gap at their inner ends, and a tuner comprising a plunger pin for said resonator, and means for inserting and withdrawing said pin from said resonator in a predominately inductive portion of the resonator for tuning, characterized in that said resonator is provided with a cylindrical groove in the outer wall terminating in contiguous surface relation to said radial walls, said pin having a radius of curvature slightly less than the radius of curvature of said groove, and being positioned at the center of said groove in tangential contact with said outer wall.

2. A tunable magnetron provided with a plurality of sector shaped cavity resonators positioned about a common center formed by radial division walls and an outer substantially cylindrical wall, and a tuner comprising a plurality of plunger pins one for each resonator, and means for simultaneously inserting and withdrawing said pins from said resonators in a predominately inductive portion of the resonator for tuning, characterised in that said resonators are each provided with a cylindrical groove in the outer wall in contiguous surface relation to said radial division walls, said pins each having a radius of curvature slightly less than the radius of curvature of said grooves, and each being positioned at the center of its associated groove in tangential contact with said outer wall.

3. A magnetron according to claim 2, wherein the diameter of curvature of said grooves is substantially .055 inch, and the diameter of curvature of said pins is substantially 0.46 inch.

4. A magnetron in accordance with claim 2, wherein said pins have said radius of curvature throughout the surface adjacent the walls of said grooves, the diameter of the pins in a direction normal to the line of contact between the pins and grooves being greater than that defined by said radius of curvature of said pins.

5. A magnetron according to claim 2, wherein the surface defined by said cylindrical grooves and the corresponding surfaces of said radial walls are tangent.

6. A tunable magnetron provided with a cavity resonator, formed by radial walls and an outer substantially cylindrical wall, said radial walls providing an inter-action gap at their inner ends, and the tuner comprising a plunger pin for said resonator and means for inserting and withdrawing said pin substantially parallel with the axis of said cylindrical portion from said resonator in a predominately inductive portion of the resonator for tuning, characterized in that said resonator is provided with a groove in the outer wall terminating in contiguous surface relation to said radial walls, said pin having a radius of curvature less than the radius of curvature of said groove and being positioned in said groove in substantially tangential contact with said outer wall.

7. In a multi-cavity tunable magnetron including a cathode and an anode surrounding said cathode and having a plurality of cavity resonators extending radially from said cathode, each of said cavity resonators having an open end adjacent said cathode and a closed end remote from said cathode, a tuning mechanism comprising a plurality of tuning plungers, corresponding to said plurality of resonators, respectively, at least a portion of each of said plungers being positioned in the corresponding resonator and in substantially tangential contact with the closed end wall thereof; and means for moving said plungers relative to the corresponding resonators while maintaining said contact to vary the effective inductance of said resonators.

8. In a multi-cavity tunable magnetron including a cathode and an anode surrounding said cathode and having a wall portion defining a plurality of cavity resonators extending radially from said cathode, a tuning mechanism comprising a plurality of tuning plungers corresponding to said plurality of resonators, respectively, each of said plungers being positioned in a predominately inductive portion of the corresponding resonator and in substantially tangential contact with said outer wall portion, and means for moving said plungers relative to the corresponding resonators while maintaining said contact to vary the effective inductances of said resonators.

9. In a tunable magnetron having a cavity resonator formed by a pair of radial walls and an outer circumferential wall, a tuning mechanism comprising a tuning plunger positioned in a predominately inductive portion of said resonator and in substantially tangential contact with said outer wall, and means for inserting and withdrawing said plunger from said resonator.

10. The tuning mechanism defined in claim 9, wherein said outer wall has a curved surface forming one end of said cavity resonator and said plunger is in contact with said curved surface.

References Cited in the file of this patent

UNITED STATES PATENTS 2,418,469 Hagstrum -------------- Apr. 8, 1947